Nov. 8, 1932.     K. R. MANVILLE     1,886,823
MULTIPLE TRANSMISSION SHAFT DRIVE FOR MOTOR VEHICLES
Filed Feb. 14, 1930
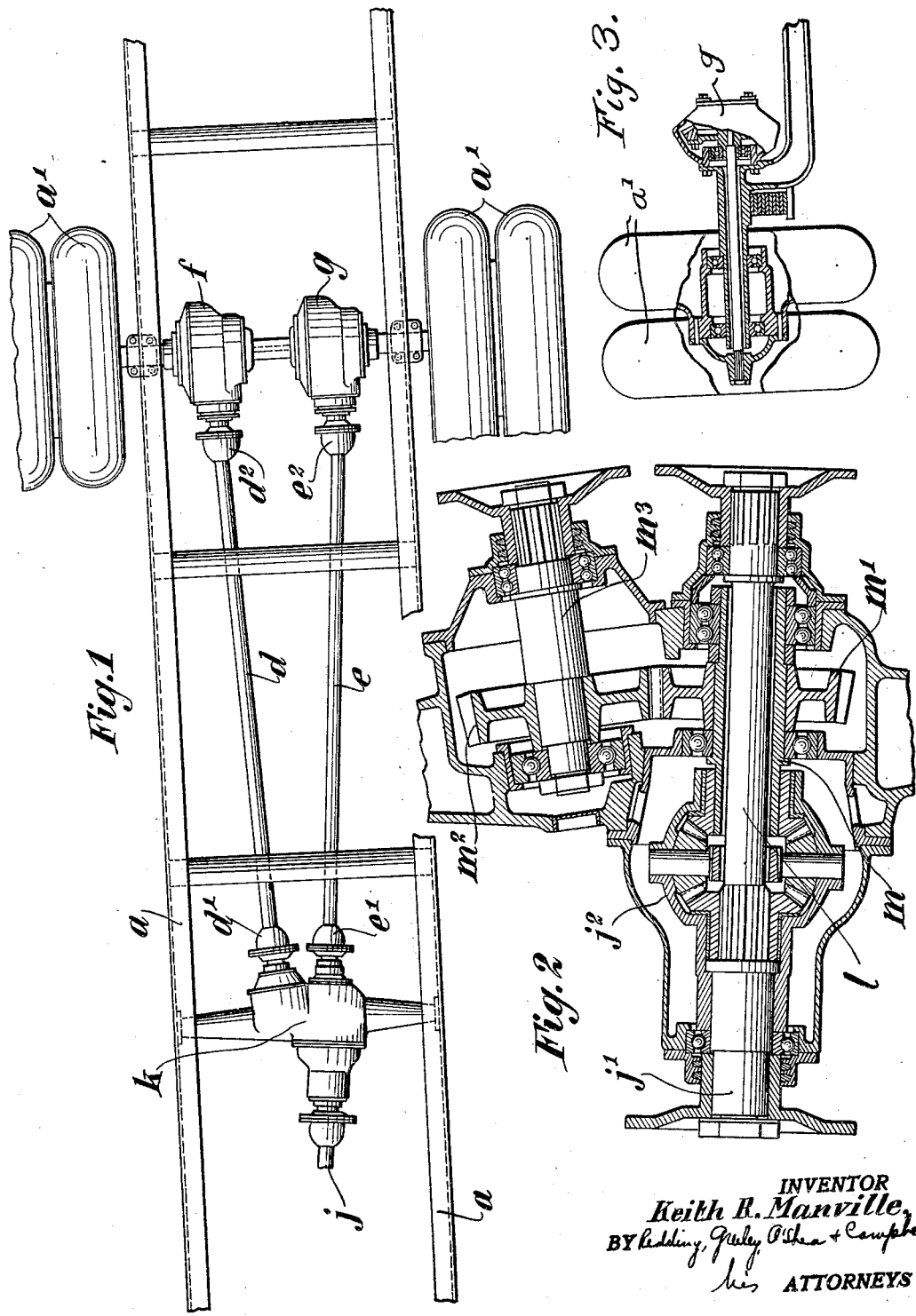

Patented Nov. 8, 1932

1,886,823

UNITED STATES PATENT OFFICE

KEITH R. MANVILLE, OF LIVINGSTON MANOR, NEW JERSEY, ASSIGNOR TO INTERNATIONAL MOTOR COMPANY, OF NEW YORK, N. Y., A CORPORATION OF DELAWARE

MULTIPLE TRANSMISSION SHAFT DRIVE FOR MOTOR VEHICLES

Application filed February 14, 1930. Serial No. 428,305.

The present invention relates to final drives for motor vehicles and embodies more specifically an improved construction by means of which independent propeller shafts transmit power from a power dividing unit mounted upon the vehicle frame to independently driven stub axles mounted at either side and rearwardly thereof upon the frame.

In existing designs, the final drive in commercial vehicles presents an obstacle to proper body construction in that the differential carried upon the rear axle requires the body to be sufficiently clear of the differential mechanism to accommodate the most extreme movements of the axle in various conditions of operation. In order to reduce the height of the body and the center of gravity of the vehicle, it has heretofore been necessary to provide a ramp or raised portion in the floor of the vehicle to provide the necessary clearance for the differential. The objection to this construction is obvious and need not be discussed in greater detail herein.

In order to overcome the foregoing objection, it is proposed, by the present invention to mount the differential on the chassis and transmit power to the final drives which are in the form of independent units carried upon the axle at either side of the frame. The foregoing structure permits the body to be constructed with a through aisle having no obstructions or ramps since the aisle portion lies between the final drives.

An object of the invention, accordingly, is to provide an improved power dividing unit and driving mechanism for supplying power to a pair of final drive units mounted upon either side of the vehicle.

A further object of the invention is to provide a construction of the above character in which the power apportioning means is mounted upon the frame and adjacent the median plane thereof, suitable transmission mechanism carrying the power from the dividing unit to the final drive.

Further objects, not specifically enumerated above, will be apparent as the invention is described in greater detail in connection with the accompanying drawing, wherein:

Figure 1 is a plan view showing a vehicle chassis constructed in accordance with the present invention.

Figure 2 is a view in horizontal section taken through the power dividing unit of Figure 1 and showing the elements thereof in detail.

Figure 3 is a view in rear elevation, partly broken away and in section, showing the rear axle and mounting means for the final drive.

Referring to the above drawing, $a$ designates the side frame members of a motor vehicle chassis carrying driving wheels $a'$, mounted in any desired manner. A shaft $j$ supplies power from an engine to a power apportioning means $k$, from which spaced diverging propeller shafts $d$ and $e$ transmit the drive to final drives $f$ and $g$, respectively. Shaft $d$ is connected to the power apportioning means and final drive $f$ through the respective universal joints $d'$ and $d^2$, while shaft $e$ is connected to the corresponding elements through the respective universal joints $e'$ and $e^2$. The final drives $f$ and $g$ may be in any desired form and form no part of the present invention, the clearance between the housings for the said drives being sufficient to accommodate an unobstructed central aisle on the body.

Referring to the power apportioning means, it will be seen that the engine is mounted at an angle to the median plane of the chassis and preferably in alignment with one of the propeller shafts, shown herein as shaft $e$. The shaft $j$ drives a shaft section $j'$ through a suitable universal joint, a differential carrier $j^2$ being driven by the shaft section $j'$. One of the bevel gears of the differential drives the shaft $l$ which is connected at its extremity to the universal joint $e'$ and the other bevel gear of the differential drives sleeve $m$ upon which a gear $m'$ is secured. This sleeve is suitably journaled in the housing and drives a cooperating gear $m^2$ which is secured upon shaft $m^3$. Shaft $m^3$ drives the universal joint $d'$ and is in alignment with the shaft $d$, suitable bearings being provided within the housing $k$ to journal the shaft $m^3$.

From the foregoing, it will be seen that the gears $m'$ and $m^2$ are beveled to accommodate the angularity of shaft $m^3$ and $l$. The foregoing construction affords a drive in which the angularities are accommodated entirely by gearing, (with the exception of the angularities at $d^2$ and $e^2$), thus relieving the universal joints $d'$ and $e'$ from the stresses incident to the transmission of power between shafts lying at angles to each other.

While the invention has been described with specific reference to the accompanying drawing, it is not to be limited, save as defined in the appended claim.

I claim as my invention:

A vehicle comprising a plurality of driving wheels, an axle having a central downwardly offset portion, the extremities of the axle being hollow to receive jack shafts, means to journal the wheels upon the extremities of the axle, spaced final drive securing means at the extremities of and lying within the offset portion of the axle and concentric with the hollow extremities thereof, a power shaft angularly disposed on the frame with respect to the axis of the frame, independent final drives mounted upon the spaced securing means and lying within the offset, power apportioning means on the frame, a propeller shaft in line with the power shaft and driving one of the final drives from the apportioning means, and a second propeller shaft on the opposite side of the axis symmetric with the first and connecting the apportioning means with the other final drive.

This specification signed this 29 day of January A. D. 1930.

KEITH R. MANVILLE.